United States Patent [19]
Brey

[11] 3,850,212
[45] Nov. 26, 1974

[54] RADIALLY EXPANDING ROTATABLE APPARATUS FOR SUPPORTING TIRES

[75] Inventor: Wilhelm Brey, Cuyahoga Falls, Ohio

[73] Assignee: Lodi Division of Intercole Automation, Inc., Lodi, Calif.

[22] Filed: Nov. 12, 1973

[21] Appl. No.: 414,975

[52] U.S. Cl.............. 144/288 A, 156/417, 157/13, 279/114
[51] Int. Cl............................................. B25h 5/00
[58] Field of Search......... 144/288 R, 288 A; 279/2, 279/114; 157/13; 156/400, 415, 414, 417, 418

[56] References Cited
UNITED STATES PATENTS

| | | | |
|---|---|---|---|
| 1,699,359 | 1/1929 | Hay..................................... | 279/114 |
| 2,197,808 | 4/1940 | Mason ............................ | 144/288 A |
| 3,374,138 | 3/1968 | Porter et al..................... | 156/417 X |
| 3,405,023 | 10/1968 | Eckenwiler et al............. | 156/417 X |
| 3,578,045 | 5/1971 | Lundberg.......................... | 144/288 A |
| 3,674,067 | 7/1972 | Cooper............................ | 144/288 A |
| 3,770,032 | 11/1973 | Stull................................ | 144/288 A |

Primary Examiner—Andrew R. Juhasz
Assistant Examiner—W. D. Bray
Attorney, Agent, or Firm—Jessup & Beecher

[57] ABSTRACT

A radially expanding tire supporting apparatus is provided for temporarily supporting a tire for rotation to permit buffing or other operations to be carried out on the tire. The apparatus includes a jaw supporting member which is rotatably mounted on a shaft. A scroll wheel is also rotatably mounted on the shaft, and the scroll wheel is provided with helical threads which engage corresponding threads on each of a plurality of radially movable jaws mounted on the jaw supporting member. When the scroll wheel is turned by the shaft and the jaw supporting member is held in a fixed angular position, the scroll wheel causes the jaws to expand radially outwardly or, conversely, to be drawn radially inwardly. The apparatus of the invention includes impact means coupling the scroll wheel to the shaft to overcome an initial tendency for the threads of the scroll wheel and of the jaws to jam. In addition, jamming is minimized by providing the thread teeth on the scroll member and jaws with a tapered shape, and by forming the threads with a double-spiral changing-pitch configuration.

3 Claims, 5 Drawing Figures

RADIALLY EXPANDING ROTATABLE APPARATUS FOR SUPPORTING TIRES

BACKGROUND OF THE INVENTION

The tire supporting apparatus of the invention is of the same general type as described in U.S. Pat. No. 3,578,045 which issued May 11, 1971, and which is assigned to the present assignee. The tire supporting apparatus described in the patent is characterized by a frame which rotatably supports a shaft. A jaw supporting member is rotatably mounted on the shaft, and it mounts a plurality of radially movable jaws each having a segment formed with helically extending threads. A scroll wheel is keyed to the shaft in the prior art apparatus, and it is formed with helically extending threads that engage the threads of the jaw segments. A brake is provided which can be controlled to lock the jaw support member to the shaft to allow relative rotation between the scroll wheel and jaw segments, so that the jaws may undergo radial outward movement to permit a tire to be clamped around the outer periphery of the jaws. When the tire has been clamped around the jaws, the brake is released, so that the tire may be rotatably driven by the shaft. Means is provided for inflating the tire when it is first mounted on the jaws.

Problems have been encountered in the prior art apparatus such as described above, in which the scroll wheel is directly keyed to the drive shaft. These problems usually involve the tendency for the threads of the scroll wheel to jam with the threads of the jaw segments at the beginning of the operation. As mentioned above, the apparatus of the present invention is constructed, on one of its embodiments, so that the threads of the scroll wheel and jaws are formed in a double helix configuration, and with a varying pitch. Moreover, the thread teeth of both the scroll wheel and the jaw segments have a tapered configuration. Both of the foregoing features have been found to minimize the tendency for the scroll wheel to jam with the jaw segments.

More importantly, instead of keying the scroll wheel directly to the drive shaft, as is the case in the prior art construction, the scroll wheel of the apparatus of the invention is actually rotatably mounted on the shaft, and is driven by a scroll wheel impact drive plate which is mounted on the shaft adjacent the scroll wheel. The drive plate has an axially protruding portion which extends into an opening in the scroll wheel. The opening in the scroll sheel has an arcuate length greater than the arcuate length of the protruding portion of the drive plate, so that when the shaft is first turned, the drive plate turns freely until its protruding portion impacts the side of the opening in the scroll wheel. This initial impact in the drive of the scroll wheel successfully overcomes any tendency for its threads to jam with the threads of the jaw segments, and it causes the apparatus to operate efficiently without jamming at all times.

DETAILED DESCRIPTION OF THE ILLUSTRATED EMBODIMENT

Figure 1:
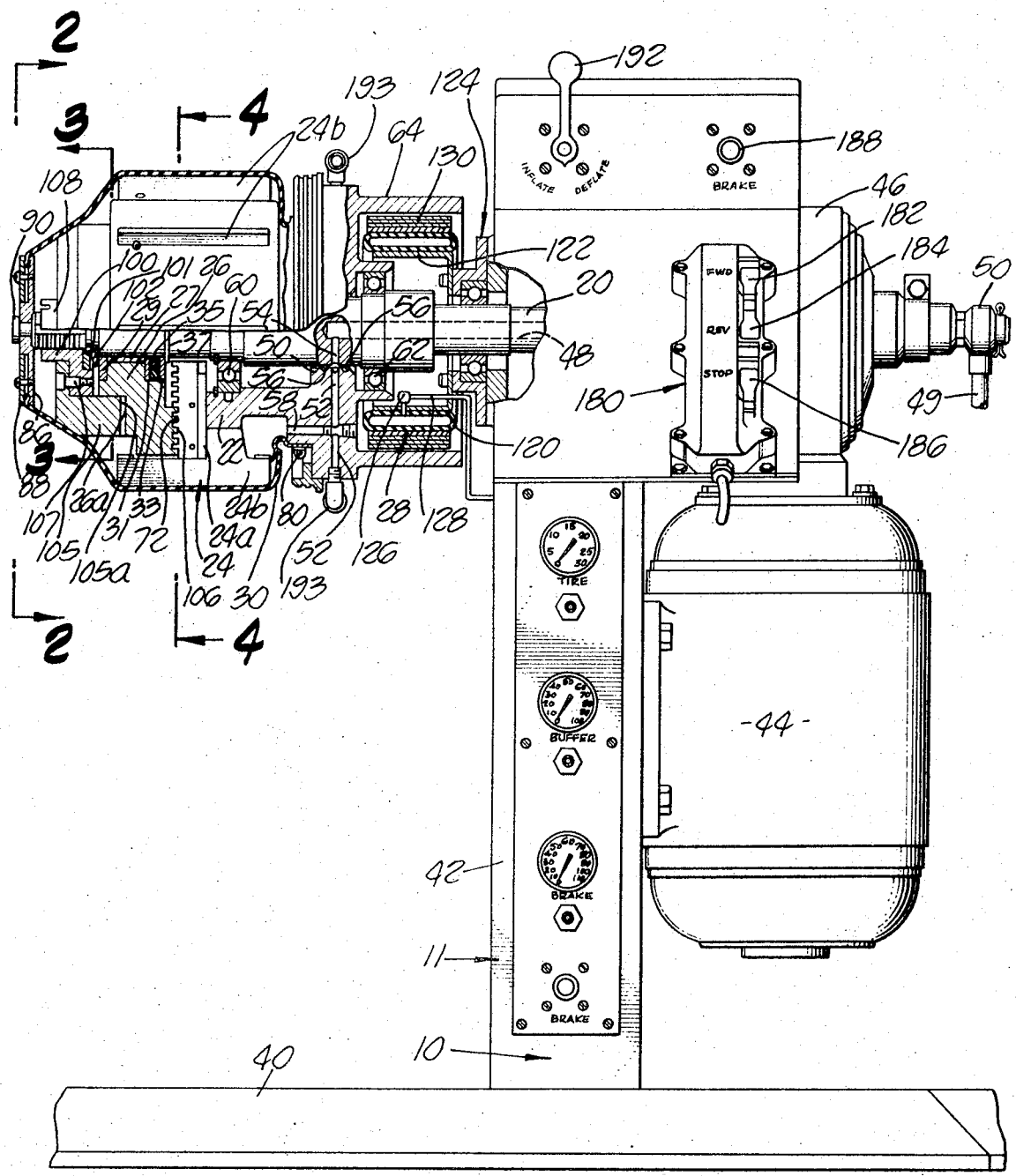
FIG. 1 is a side elevational view, partly in section, of apparatus embodying the invention.

As shown in the drawings, the illustrated embodiment of the invention includes generally a frame 10, a horizontally extending shaft 20 rotatably mounted on the frame, a jaw supporting member generally designated 22 which is rotatably supported by the shaft 20, and a plurality of radially expandable jaws 24 supported in the jaw supporting member and positioned at equiangular positions about its periphery. A scroll wheel 26 is rotatably mounted on the shaft 20 in press fit with a bushing 27. A hard steel washer 29 is mounted at one end of the bushing 27; and a pair of hard steel washers 31, 33, separated by an intermediate member 35, are mounted as a thrust bearing at the other end of the bushing.

Axial movement of the scroll wheel and its associated elements, to the right in FIG. 1 is limited by a retaining ring 37. Each of the jaws 24 has a segment 24a attached to it, and these jaw segments have helically formed threads therein which engage mating helical threads in the adjacent face of the scroll wheel 26. The retaining ring 37 holds the scroll wheel a minimum distance from the jaw segments 24a. The thread engagement between the scroll wheel and the jaw segments is such that when the jaw support member 22 is held in a locked position, rotation of the scroll wheel by the shaft 20 causes the jaws 24 to expand radially. The jaws are used to hold a tire in a clamped position on the apparatus, as described in more detail in U.S. Pat. No. 3,578,045, referred to above.

The frame 10 includes a horizontal base 40, and an upright housing 42 is mounted on the base. The upper portion of the housing 42 supports the shaft 20 by suitable bearing means. The shaft 20 is rotated by an electric motor through a gear box 46 in a conventional manner. The shaft 20 is provided with an axially extending air passage 48, the rear end of which is connected to a source of pressurized air by means of a hose 49 through a conventional fitting 50. Such a fitting permits relative rotation between the shaft and the hose.

As shown in FIG. 1, the jaw supporting member 22 is of a generally annular configuration, and it includes a collar portion 50 which is bored to snugly receive the shaft 20. A plurality of radially extending air passages are formed in the jaw supporting member 22 through the collar portion 50 to connect with radial extensions 54 of the axial shaft passage 48. Appropriate O-rings 56 are carried by the collar portion 50 on either side of the passage 52 for sealing purposes. A forward extension 58 of at least one of the axial passages 52 is provided.

Front and rear bearings 60 and 62 are interposed between the jaw supporting member 22 and the shaft 20. The rear portion of the jaw supporting member is formed with a rearwardly extending drum element 64 that encircles a brake assembly 28.

Figure 2:
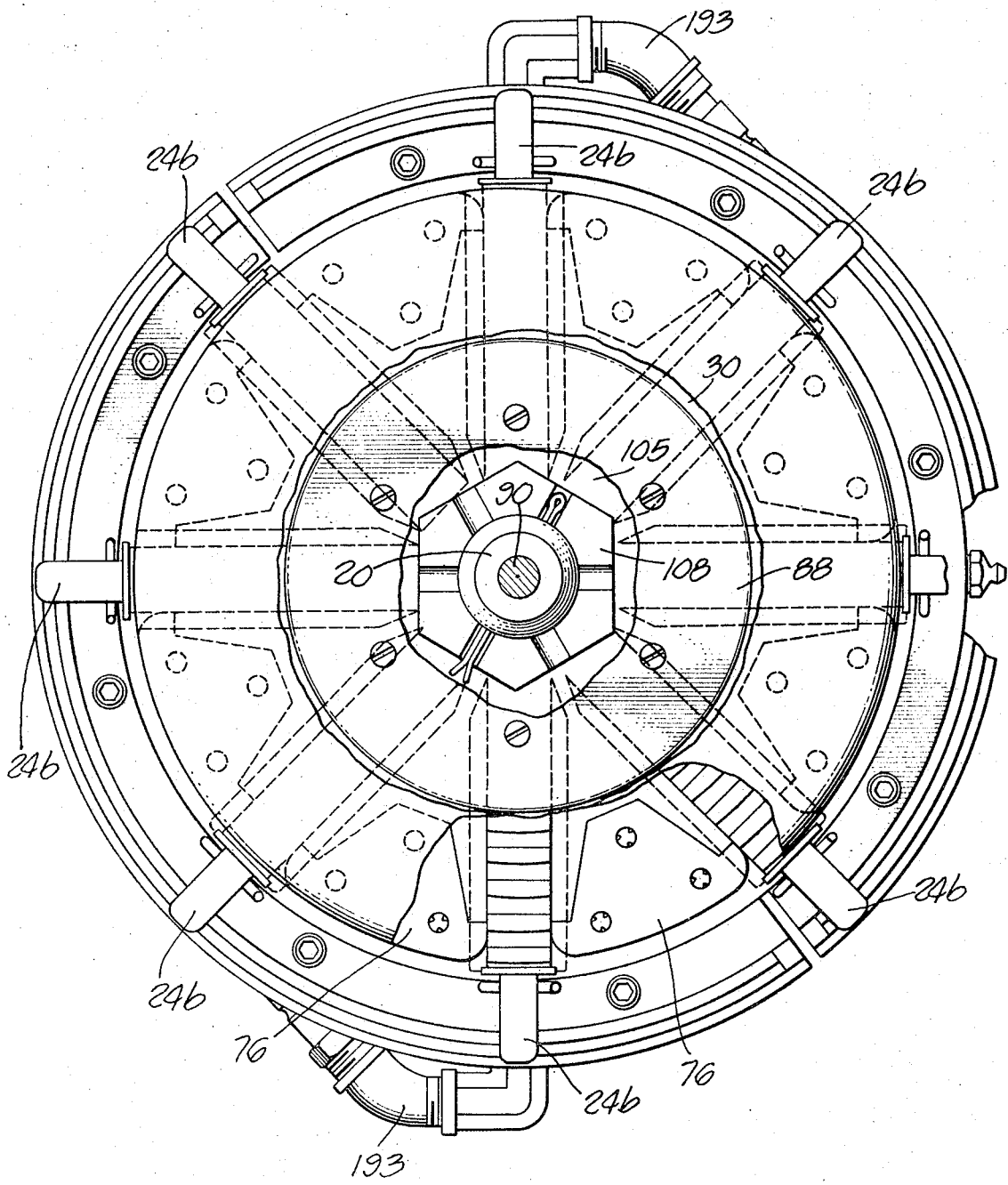
FIG. 2 is an end view of the apparatus of FIG. 1 taken from the left-hand end of FIG. 1.

The jaws 24 are radially slidable supported within complementary radially extending slots formed in the jaw supporting member 22. The jaws 24 are of like construction, and each includes a jaw segment 24a having helical threads 72 formed on its front face. The radial outer portion of each jaw 24 is rigidly secured to an end piece 24b. Jaw stops 76 (FIG. 2) are provided on the jaw supporting member 22 to limit the radial outward movement of the jaws 24.

A shroud 30 is formed of suitable resilient material such as synthetic rubber. The rear end of the shroud is affixed to the intermediate portion of the jaw supporting member 22 by a clamp 80. The front end of the shroud 30 is sandwiched between an end plate 86 and a retainer plate 88. The end plate 86 and retainer plate 88 are coaxially rotatably supported upon the front end of the shaft 20 by means of a shoulder bolt 90. As described in the U.S. Pat. No. 3,578,045, the interior of the shroud 30 is pressurized so as to preclude the entry of rubber dust into the mechanism of the wheel assembly.

Figure 3:
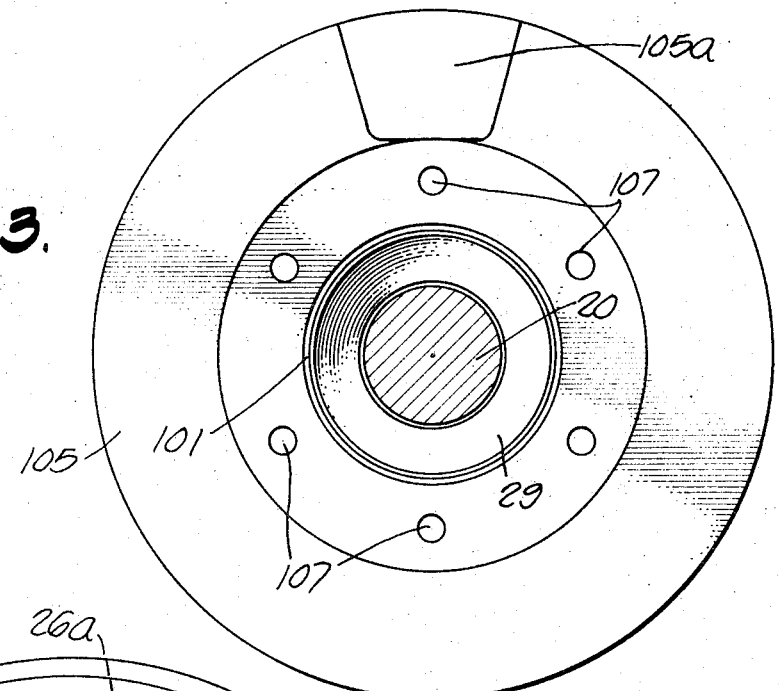
FIG. 3 is a section taken along the line 3—3 of FIG. 1, and showing the inner face of a scroll wheel nut and drive plate which is included in the assembly.

The scroll wheel 26 is held in place on the shaft 20 by a scroll wheel nut 100 threaded onto the end of the shaft 20. A hard steel washer 101, and one or more spring washers 102 are interposed between the nut and the hard steel washer 29 at the end of the scroll wheel. The spring washers bias the scroll wheel to the left in FIG. 1. A circular scroll wheel impact drive plate 105 is secured to the nut 100 in coaxial relationship therewith by a plurality of screws, such as the screw 107. However, it might be preferable to make the drive plate and nut integral and dispense with the screw 107. The drive plate 105 has an axially protruding portion 105a which extends into an opening 26a of the scroll wheel. The right-hand face of the scroll wheel drive plate 105 and its axially projecting portion 106a are shown in FIG. 3.

Figure 4:
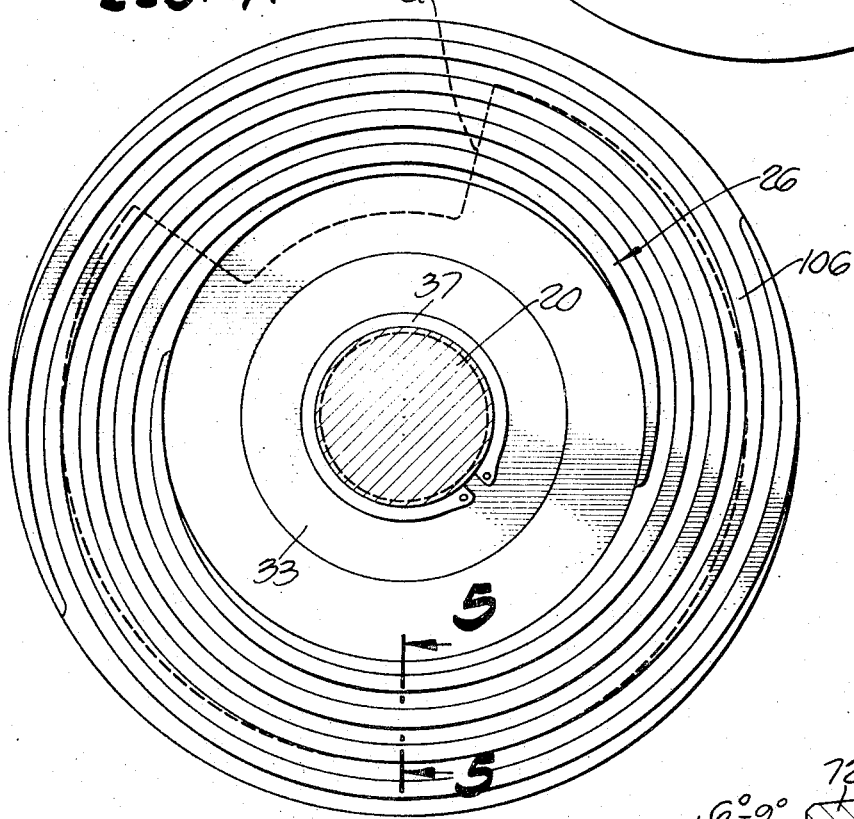
FIG. 4 is a section taken along the line 4—4 of FIG. 1, and showing the inner face of the scroll wheel itself.

The right-hand face of the scroll wheel in FIG. 1 is shown in FIG. 4, and the representation of FIG. 4 shows schematically the double spiral construction of the threads of the scroll, and the varying pitch arrangement of the threads. The opening 26a in the rear of the scroll wheel has, for example, an arcuate length of 68° which is considerably greater than the arcuate length of the protruding portion 105a of the drive wheel 105.

Figure 5:
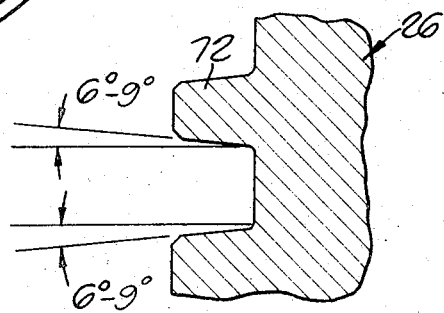
FIG. 5 is a section taken along the line 5—5 and showing the configuration of the teeth of the scroll wheel.

The actual shape of the threads 72 of the scroll wheel 26 is shown in FIG. 5, the illustrated thread having a 6°–9° taper to minimize jamming between the scroll wheel and the jaw segments 24a. The threads of the jaw segments 24a have the same cross-section in the center as the threads 72, and they match the scroll spiral on the small diameter as well as on the outside diameter. They also may be formed with the double spiral, varying pitch construction of the threads 106 of the scroll, as described above in conjunction with FIG. 4.

It will be appreciated that when the shaft 20 is first turned, the drive plate 105 will turn with the shaft freely until its protruding portion 105a impacts with the end of the opening 26a in the scroll wheel 26, to provide an initial jarring action. This jarring action serves to overcome inertia and jamming effects, so that the rotary motion of the scroll may be smoothly translated into the radial movement of the jaw segments 24a and associated jaws 24 to expand the jaws radially outwardly to a clamping position with the supported tire. At the end of the operation, the rotation of the shaft 20 is reversed, and again an impact occurs between the drive plate 105 and the scroll wheel 26 so that the jaws may be moved radially inwardly as the scroll wheel rotates in the opposite direction.

The brake 28 may be of the type described in the U.S. Pat. No. 3,578,045, and it includes a resilient bladder 120 which encircles a dish-shaped retainer 122 affixed to a bearing housing 124 disposed on the front of the frame housing 42. The interior of the bladder 120 is connected with a source of pressurized air by means of a fitting 126 and tubing 128. The outer surface of the bladder 120 supports a brake lining 130. In the operation of the brake 28, pressurized air is admitted to the interior of the bladder 120 so as to effect radially outward expansion thereof with such expansion moving the brake lining material 130 into yielding frictional engagement with the interior of the drum 64 of the jaw supporting member 22, so that rotation of the jaw supporting member on the shaft 20 is arrested.

The control system of the apparatus, as shown in FIG. 1, may be similar to the control system described in U.S. Pat. No. 3,578,045 and it includes a motor control box generally designated 180 secured to the upper rear portion of the frame housing 42. The switch box 180 includes a "forward" switch 182, a "reverse" switch 184, and a "stop" switch 186. To effect forward rotation of the shaft 20, the switch 182 is depressed. If switch 186 is depressed the shaft 20 will stop, and thereafter switch 184 may be depressed to effect reverse rotation of the shaft 20.

The upper rear portion of the frame housing 42 carries a pushbutton 188 for operating the brake 28. When the pushbutton is depressed, air under comparatively low pressure is directed into the confines of the bladder 120 so as to expand the brake lining material 130 into yielding engagement with the interior of the support drum 64. A tire deflate lever 192 is mounted on the upper portion of the frame 42. This lever 192 is suitably connected to conventional valving so as to direct pressurized air through the passages 48 and 54 of shaft 20 and passages 52 of the jaw supporting member 22. This pressurized air is then conducted to the interior of the tire supported on the jaws 24 by means of flexible tubing attached to the fittings 193.

In the operation of the apparatus, a tire is mounted on the assembly in the manner fully described in U.S. Pat. No. 3,578,045. Thereafter the operator moves the air control lever 192 into its tire inflating position. Pressurized air is then directed into the confines of the tire. The operator then depresses the pushbutton 188 to operate the brake 28, and cause it to hold the jaw supporting member 22 against rotation on the shaft 20. Thereafter the operator depresses the "forward" motor control switch 182 so as to effect forward rotation of the shaft 20. Since the brake 28 is actuated, the jaw supporting member 22 is yieldingly restrained against rotation of the shaft 20, as mentioned above.

The scroll wheel plate 105 rotates until its impact portion 105a impacts against the end of the scroll opening 26a and drives the scroll around the axis of the shaft 20. This assures that the jaws 24 and their associated parts will undergo radially outward movement relative to the scroll wheel 26, from the interengagement of the threads 72 of the jaw segments 24a with the threads 106 of the scroll wheel 26. This action continues until the tire is firmly clamped around the assembly, at which point the brake 28 is released. The frictional resistance between the threads 72 and 106 of the jaw segments 24a and the scroll wheel 26 will preclude reverse radially inward movement of the jaws relative to the scroll wheel. The tire may now be rotated freely by the shaft 20, so that the desired tire treating operations, such as buffing may take place.

At the conclusion of the operation, the air control lever 192 is moved to its "deflate" position. This serves to vent the interior of the tire to the atmosphere by means of suitable conventional valving elements. Forward rotation of the shaft 20 is then stopped. The operator then again actuates the brake 28 and causes reverse rotation of the shaft 20, so that the jaws 24 will undergo radially inward movement to release the tire. At the beginning of the reverse operation, the impact wheel 105 will again cause its portion 105*a* to impact against the end of the opening 26*a* in the scroll wheel to overcome any jamming tendency.

The invention provides, therefore, an improved construction for an apparatus for temporarily supporting a tire for rotation, during a buffing or other operation. The apparatus of the invention has a feature in that the intercoupling between the scroll wheel and the jaw segments is such that jamming is prevented, and efficient operation of the machine takes place at all times.

It will be appreciated that while a particular embodiment of the invention has been shown and described, modifications may be made. It is intended in the claims to cover all the modifications which come within the spirit and scope of the invention.

What is claimed:

1. Tire supporting apparatus comprising: a frame; a shaft rotatably supported on said frame; a jaw support member rotatably mounted on said shaft; a plurality of jaw members carried by said jaw support member for radial movement relative to the axis of rotation of said shaft and each having a section with helically extending threads formed thereon; a scroll wheel rotatably mounted on said shaft and formed with helically extending threads engaged with the threads of said jaw member sections, said scroll wheel having an opening therein; and a drive member affixed to said shaft and having a section extending axially with respect to said shaft into said opening in said scroll wheel, said section of said drive member having an arcuate length less than the arcuate length of said opening, so that rotation of said shaft causes said section of said drive member to impact with the corresponding end of said opening.

2. The tire supporting apparatus defined in claim 1, in which the threads of said scroll wheel are formed in a double helix of varying pitch.

3. The tire supporting apparatus defined in claim 1, in which the threads of said scroll wheel and of said jaw sections each have a tapered configuration.

* * * * *